US008526278B2

(12) United States Patent
Fujiwara et al.

(10) Patent No.: US 8,526,278 B2
(45) Date of Patent: Sep. 3, 2013

(54) RECORDING METHOD, RECORDING DEVICE, OPTICAL DISC, OPTICAL DISC MANUFACTURING METHOD, AND OPTICAL DISC DRIVE DEVICE

(75) Inventors: Yasuhisa Fujiwara, Osaka (JP); Hiroyasu Ueno, Osaka (JP); Hiroyasu Iwatsuki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/990,134

(22) PCT Filed: May 18, 2009

(86) PCT No.: PCT/JP2009/059144
§ 371 (c)(1),
(2), (4) Date: Oct. 28, 2010

(87) PCT Pub. No.: WO2009/142178
PCT Pub. Date: Nov. 26, 2009

(65) Prior Publication Data
US 2011/0038238 A1 Feb. 17, 2011

(30) Foreign Application Priority Data
May 20, 2008 (JP) ................................ 2008-132219

(51) Int. Cl.
*G11B 7/00* (2006.01)
(52) U.S. Cl.
USPC ....................................................... 369/44.27
(58) Field of Classification Search
None
See application file for complete search history.

(56) References Cited

U.S. PATENT DOCUMENTS

| 5,546,585 | A | | 8/1996 | Soga |
| 5,774,434 | A | | 6/1998 | Arataki et al. |
| 6,052,346 | A | * | 4/2000 | Arataki et al. ............. 369/47.54 |
| 6,138,203 | A | | 10/2000 | Inokuchi et al. |

(Continued)

FOREIGN PATENT DOCUMENTS

| CN | 1115473 A | 1/1996 |
| CN | 101030223 A | 9/2007 |

(Continued)

OTHER PUBLICATIONS

Daisaku Chiba, "Knoppix Gets Faster This! Introduction of Accelerated-Knoppix Project", Alpha Systems Inc., 1st IPBA Seminar 2006, pp. 1-38, May 26, 2006.

(Continued)

*Primary Examiner* — Joseph Feild
*Assistant Examiner* — Parul Gupta
(74) *Attorney, Agent, or Firm* — Birch, Stewart, Kolasch & Birch, LLP

(57) ABSTRACT

In a recording system (1), a personal computer (20) reads out boot information from an optical disc (31) in a predetermined order and records elements of the boot information in contiguous areas on the optical disc (32). In order to thus operate, the personal computer (20) refers to access records before reading out the boot information from the optical disc (31). The access records are generated by a protocol analyzer (11) at a start-up of a personal computer (10). Further, for each of the elements indicated by the access records, the personal computer (20) records, on the optical disc (32), an address conversion table in which that area on an optical disc (31) in which the element is recorded and that area on the optical disc (32) in which the element is recorded are correlated with each other.

9 Claims, 7 Drawing Sheets

(56) References Cited

U.S. PATENT DOCUMENTS

| | | | |
|---|---|---|---|
| 7,801,015 B2 * | 9/2010 | Yoshida et al. | 369/275.3 |
| 2006/0140095 A1 * | 6/2006 | Kazami et al. | 369/59.1 |
| 2006/0209649 A1 | 9/2006 | Vlutters et al. | |
| 2007/0223879 A1 | 9/2007 | Ito et al. | |
| 2009/0040914 A1 | 2/2009 | Yoshida et al. | |

FOREIGN PATENT DOCUMENTS

| | | |
|---|---|---|
| EP | 1 604 361 B1 | 10/2008 |
| EP | 1 025 534 B1 | 3/2011 |
| JP | 3-78851 A | 4/1991 |
| JP | 4-266136 A | 9/1992 |
| JP | 5-210915 A | 8/1993 |
| JP | 5-216594 A | 8/1993 |
| JP | 5-289854 A | 11/1993 |
| JP | 9-91879 A | 4/1997 |
| JP | 11-85411 A | 3/1999 |
| JP | 2002-074851 A | 3/2002 |
| JP | 2002-222087 A | 8/2002 |
| JP | 2007-188592 A | 7/2007 |
| KP | 10-97751 A | 4/1998 |
| RU | 2 182 722 C2 | 5/2002 |
| WO | WO 99/09513 A2 | 2/1999 |
| WO | WO 2004/081919 A2 | 9/2004 |
| WO | WO 2007/091620 A1 | 8/2007 |

OTHER PUBLICATIONS

Abe et al., "Actualization of Strating Acceleration of CD/DVD Starting Linux 'Knoppix'", Alpha Systems Inc., National Institute of Advanced Industrial Science and Technology, 68th National Convention of Information Processing Society of Japan., pp. 49-50.

Daisaku Chiba, "Knoppix Gets Faster This! Introduction of Accelerated-Knoppix Project", Alpha Systems Inc., 1st IPBA Seminar 2006, pp. 1-12, May 26, 2006.

Tan et al., "Accelerated Knoppix-Toward True Open Source Software Base", Alpha Systems Inc., Yokohama Linux Users Group, 55th Kernel Conference, pp. 1-59, Nov. 16, 2005.

* cited by examiner

F I G. 1
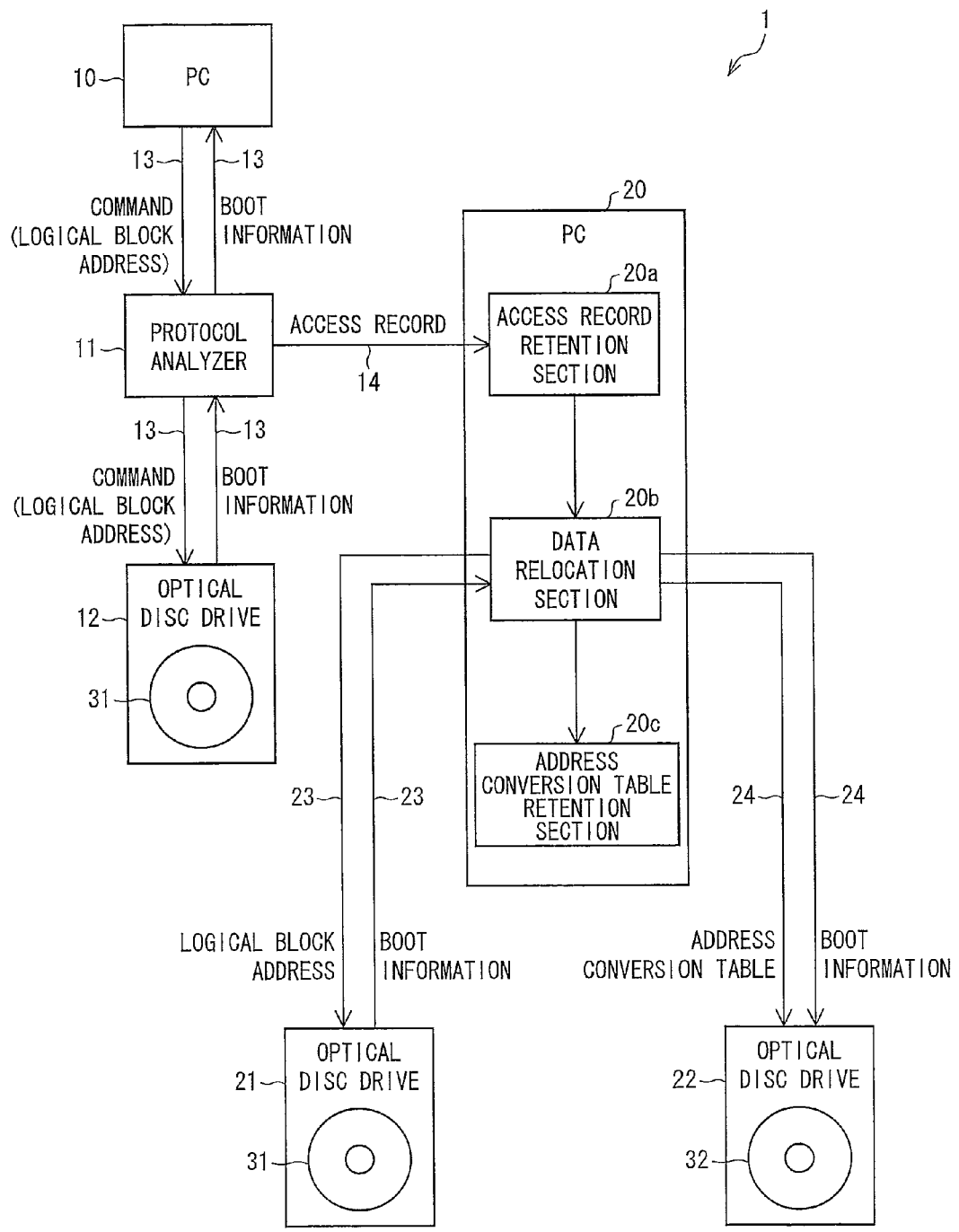

F I G. 7
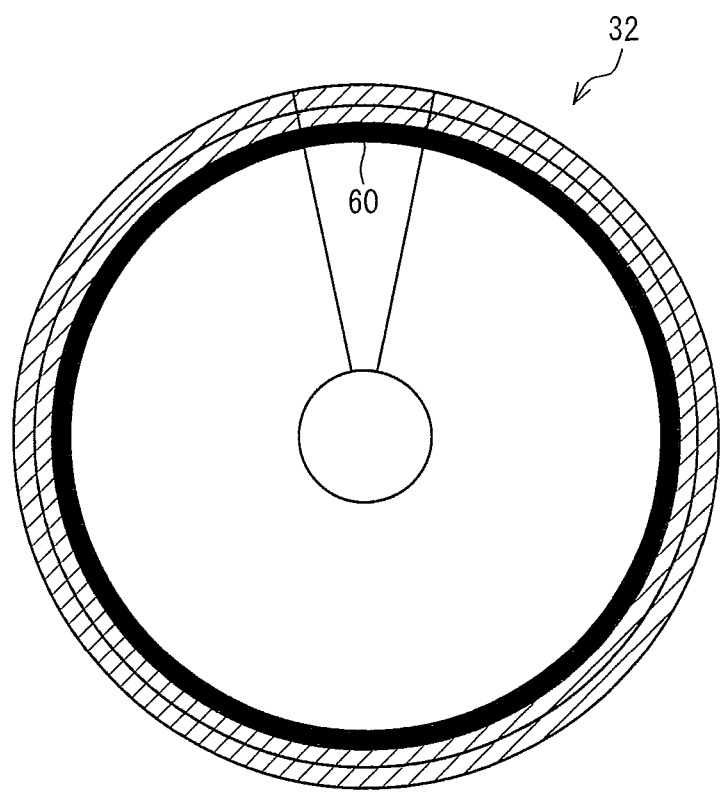

RECORDING METHOD, RECORDING DEVICE, OPTICAL DISC, OPTICAL DISC MANUFACTURING METHOD, AND OPTICAL DISC DRIVE DEVICE

BACKGROUND OF THE INVENTION

1. Field of the Invention

The present invention relates to a method for recording information on an optical disc and a device for recording information on an optical disc. Further, the present invention relates to an optical disc on which information is recorded by such a recording method, and to a method for manufacturing such an optical disc. Furthermore, the present invention relates to an optical disc drive device for reading out information from such an optical disc.

2. Description of the Related Art

There are widely used optical discs such as Blu-ray discs (BD), digital versatile disks (DVD), and compact disks (CD). These optical discs can be used as, e.g., a boot disk. The boot disk refers to an optical disc on which information (hereinafter, referred to as "boot information") is recorded to which a computer refers for booting an operating system (hereinafter, abbreviated as "OS"). Examples of elements of the boot information encompass programs such as a kernel and a device driver and data to which these programs refer.

The optical disc is superior in portability to a hard disk housed in a computer. Therefore, the use of an optical disc on which the boot information is recorded makes it possible to cause a same OS to operate both on a computer in a home and on a computer outside the home. In addition, the optical disc on which the boot information is recorded can be used in booting a computer whose internal hard disk has a failure.

However, a seek speed of the optical disc is lower than that of the hard disk drive. That is, a speed for random access to the optical disc is lower than a speed for random access to the hard disk. For this reason, a time required for booting the OS from the optical disc is longer, than a time required for booting the OS from the hard disk. Further, in a case where a process to be carried out after the OS is booted involves access to the optical disc, a time required for the process is also longer than that required for the process involving no access to the optical disc.

Actually, an optical disc to be used as a boot disk generally stores an accessory tool, data, preinstalled application software, etc., in addition to the boot information. Areas where the boot information is recorded are discretely arranged. Therefore, for example, it takes 10 minutes to 15 minutes to boot an OS by reading out, from a Blu-ray disc, boot information of approximately 300 MB to 400 MB.

Techniques for shortening a time required for booting an OS from a disc are described in, e.g., Patent Literature 1 and Non-Patent Literatures 1 and 2. Patent Literature 1 discloses a technique by which a time required for booting an OS is shortened by copying, in a main memory in advance, content of a specific file recorded on a disk. Non-Patent Literatures 1 and 2 disclose a technique for increasing a speed of an OS boot process that utilizes a compressed loop device (cloop) stored on an optical disc. Specifically, the speed is increased by optimizing positions of compressed blocks constituting the compressed loop device.

Techniques for increasing a speed of random disc access encompass, e.g., an art disclosed in Patent Literature 2. Patent Literature 2 discloses a technique by which a random access speed is increased in such a manner that a disk array apparatus housing a plurality of hard disk drives relocates data on the basis of past access history.

CITATION LIST

Patent Literature 1
Japanese Patent Application Publication, Tokukaihei, No. 3-78851 A (Publication Date: Apr. 4, 1991)
Patent Literature 2
Japanese Patent Application Publication, Tokukaihei, No. 11-85411 A (Publication Date: Mar. 30, 1999)
Non-Patent Literature 1
Hideyuki Tan et al., "Accelerated KNOPPIX—Toward True Open Source Software Base—," [online], Nov. 16, 2005, Yokohama Linux Users Group $55^{th}$ Kernel Conference, [Searched on Apr. 8, 2008], Internet (http://www.alpha-.co.jp/biz/rdg/ac-knoppix/doc/AC-KNX_YLUG55.pdf)
Non-Patent Literature 2
Daisaku Chiba, "KNOPPIX Gets Faster This!—Accelerated—Introduction of KNOPPIX Project—," [online], May 26, 2006, $1^{st}$ IPBA Seminar 2006, [Searched on Apr. 9, 2008], Internet (http://www.ipab.org/Presentation/sem06/06-01-02.pdf)

SUMMARY OF INVENTION

However, the technique described in Patent Literature 1 merely reduces a time for a start-up of an OS after content of a specific file is copied to the main memory. Accordingly, there is a problem in that the start-up time is increased in initial readout of the content of the specific file.

In addition, techniques for speeding up a start-up of an OS by use of a device driver, such as techniques disclosed in Non-Patent Literatures 1 and 2, have a problem in that it is impossible to increase a speed of readout of the boot information which is read out prior to the device driver. The techniques disclosed in Non-Patent Literatures 1 and 2 assume that the OS is started up by use of a compressed loop device. Therefore, the techniques cannot be applied to an OS which is started up without use of the compressed loop device. Another problem is that the techniques only make it possible to perform the relocation from one compressed block to another.

The technique disclosed in Patent Literature 2 assumes that the disk array device houses a hard disk. That is, the technique cannot be applied to a detachable optical disc.

The present invention was made in view of the problems. An object of the present invention is to realize a recording method and a recording device both of which make it possible to provide an optical disc from which information, such as boot information, which is read out in a predetermined order can be read out at a higher speed.

In order to attain the object, a recording method of the present invention is recording method for recording, on an optical disc, information recorded in a recording medium and made up of a plurality of elements to be read out from the recording medium in a predetermined order, the recording method including the steps of: (a) recording, respectively in contiguous areas on the optical disc, the plurality of elements in the predetermined order; and (b) recording, on the optical disc, a table correlating, for each of the elements, (i) first area specifying information specifying that area on the recording medium in which the element is recorded and (ii) a second area specifying information specifying that area on the optical disc in which the element is recorded in the step (a).

According to the arrangement, random access is not caused, provided that the plurality of elements are read out in the predetermined order. This is because, the plurality of elements are recorded in the predetermined order in the contiguous areas on the optical disc on which the information is recorded by the recording method. This makes it possible to provide an optical disc from which the plurality of elements can be read out at a higher speed, as compared to an optical disc on which areas where the plurality of elements are recorded are discretely arranged.

Further, the optical disc stores, for each of the plurality of elements, the table correlating (i) the first area specifying information specifying that area on the recording medium in which the element is recorded and (ii) the second area specifying information specifying an area where element is recorded in the step (a). Therefore, with reference to the table, an optical disc drive device can read out the plurality of elements from the optical disc as if the optical disc drive device reads out the plurality of elements from the recording medium. That is, there arises no failure in readout of the plurality of elements, despite the fact that the areas where the plurality of elements are recorded are relocated for an increase in readout speed.

The recording method of the present invention is preferably arranged such that the information is information to be read out by a computer in order to start up an operating system thereof; and the predetermined order is an order in which the computer reads out the plurality of elements from the recording medium in order to start up the operating system thereof.

The arrangement makes it possible to reduce a time for starting the OS up on the computer by use of the optical disc, as compared to a conventional time.

The recording method of the present invention, preferably further includes the step of determining the predetermined order by detecting an order in which the computer reads out, in order to start up the operating system, the plurality of elements from the recording medium.

According to the arrangement, it is possible to easily realize a recording method which makes it possible to reduce, by using the optical disc on the computer, a time for starting up the operating system as compared to a conventional time.

The recording method of the present invention is preferably arranged such that the step (b) includes preferentially selecting, as an area specified by the second area specifying information, a sector which constitutes, among tracks on the optical disc, a track closer to an outer periphery of the optical disc.

According to the arrangement, the plurality of elements to be recorded on the optical disc in the step (b) are recorded in a track closer to the outer periphery of the optical disc. In general, an optical disc drive can increase a speed of accessing information recorded in an outer track on an optical disc higher than a speed of accessing information recorded in an inner track.

This allows at least such an optical disc drive to reduce a time for reading in information made up of the plurality of elements. In addition, it is possible to reduce a time for a star-up of an OS, by arranging such that the information made up of the plurality of elements is the boot information.

The recording method of the present invention is preferably arranged such that each of the plurality of elements is information to be administered, in a file system which administers information recorded on the recording medium, as information stored in a single file.

According to the arrangement, the optical disc drive can read out the plurality of elements from the optical disc at a higher speed in a case where the optical disc drive reads out the information file by file.

Note that the plurality of elements do not have to be stored in a single contiguous area on the recording medium, provided that each of the plurality of elements is information to be administered in the file system as information stored in a single file.

The recording method of the present invention is preferably arranged such that each of the plurality of elements is (i) information to be administered, in a file system which administers information recorded on the recording medium, as information stored in a single file or in a plurality of files, and is (ii) information recorded in contiguous areas on the recording medium.

According to the arrangement, recorded on the optical disc is the table which correlates, for each of pieces of the information recorded in the contiguous areas on the recording medium, the first area specifying information specifying that area on the recording medium in which the element is recorded and the second area specifying information specifying an area where the element is recorded in the step (a). Therefore, the table stores, for each piece of the information recorded in the contiguous areas, a pair of the two types of area specifying information, independently of whether each of the pieces of information is administered as information stored in a single file or in a plurality of files. This makes it possible to reduce the number of entries to be registered in the table. As a result, a data size of the table can be reduced.

The recording method of the present invention is preferably arranged such that the plurality of elements are pieces of information which an optical disc drive which reads out information recorded on the optical disc reads in a cache memory concurrently.

According to the arrangement, the optical disc drive device can reads out from the cache memory the plurality of elements at a higher speed in a case where the optical disc device reads out the information from the optical disc and reads in the information in the cache memory. In particular, the arrangement makes it possible to suppress seeks to be caused in such a manner that the optical disc device accesses one same area on the optical disc more than time. In addition, the optical disc device can look ahead the information by referring to the table. Therefore, a cache hit ratio can be improved.

In order to attain the object, a recording device of the present invention is a recording device for recording, on an optical disc, information recorded in a recording medium and made up of a plurality of elements to be read out from the recording medium in a predetermined order, the recording device including: information recording means for recording, respectively in contiguous areas on the optical disc, the plurality of elements in the predetermined order; and table recording means for recording, on the optical disc, a table correlating, for each of the elements, (i) first area specifying information specifying that area on the recording medium in which the element is recorded and (ii) second area specifying information specifying that area on the optical disc in which the element is recorded by the information recording means.

Without causing a problem of a failure in readout the plurality of elements as is the case with the recording method, the arrangement makes it possible to provide an optical disc from which the plurality of elements can be read out at a higher speed than an optical disc on which an areas where the plurality of elements are recorded are discretely arranged.

In order to attain the object, an optical disc of the present invention is an optical disc on which information is recorded, the information being identical with information recorded in a recording medium and made up of a plurality of elements to be read out from the recording medium in a predetermined order, wherein: the plurality of elements are recorded respectively in contiguous areas in the predetermined order; and a table is recorded which correlates, for each of the elements, (i)

first area specifying information specifying that area on the recording medium in which the element is recorded and (ii) second area specifying information specifying that area on the optical disc in which the element is recorded.

Without causing a problem of a failure in readout the plurality of elements as is the case with the recording method, the arrangement makes it possible to read out the plurality of elements from the optical disc at a higher speed than an optical disc on which an areas where the plurality of elements are recorded are discretely arranged.

In order to attain the object, a method of the present invention for manufacturing an optical disc is a method for manufacturing an optical disc on which information is recorded, the information being identical with information recorded in a recording medium and made up of a plurality of elements to be read out from the recording medium in a predetermined order, the method including the steps of: (a) recording, respectively in contiguous areas on the optical disc, each of the plurality of elements in the predetermined order; and (b) recording, on the optical disc, a table correlating, for each of the elements, (i) first area specifying information specifying that area on the recording medium in which the element is recorded and (ii) a second area specifying information specifying that area on the optical disc in which the element is recorded in the step (a).

Without causing a problem of a failure in readout the plurality of elements as is the case with the recording method, the arrangement makes it possible to provide an optical disc from which the plurality of elements can be read out at a higher speed than an optical disc on which an areas where the plurality of elements are recorded are discretely arranged.

The present invention encompasses an optical disc drive device which reads out the information from the optical disc. That is, an optical disc drive device of the present invention includes: converting means for converting, with reference to the table, externally-received area specifying information into second area specifying information correlated with first area specifying information which matches with the externally-received area specifying information; and output means for (i) reading out an element of the information recorded in that area on the optical disc which is specified by the second area specifying information obtained by the converting means and (ii) outputting, outside the optical disc drive device, the element thus read out.

A recording method of the present invention is a recording method for recording, on an optical disc, information recorded in a recording medium and made up of a plurality of elements to be read out from the recording medium in a predetermined order, the recording method including the steps of: (a) recording, respectively in contiguous areas on the optical disc, the plurality of elements in the predetermined order; and (b) recording, on the optical disc, a table correlating, for each of the elements, (i) first area specifying information specifying that area on the recording medium in which the element is recorded and (ii) a second area specifying information specifying that area on the optical disc in which the element is recorded in the step (a).

Therefore, without causing a problem of a failure in readout of the plurality of elements, the arrangement makes it possible to provide an optical disc from which the plurality of elements can be read out at a higher speed than an optical disc on which an areas where the plurality of elements are recorded are discretely arranged.

For a fuller understanding of the nature and advantages of the invention, reference should be made to the ensuing detailed description taken in conjunction with the accompanying drawings.

BRIEF DESCRIPTION OF DRAWINGS

FIG. 1 is a block diagram illustrating an arrangement of a recording system of an embodiment of the present invention for recording boot information on an optical disc.

FIG. 7 is a diagram illustrating the present embodiment, specifically, illustrating an outer periphery of the optical disc on which the boot information is recorded.

DETAILED DESCRIPTION OF THE INVENTION

Figure 2:
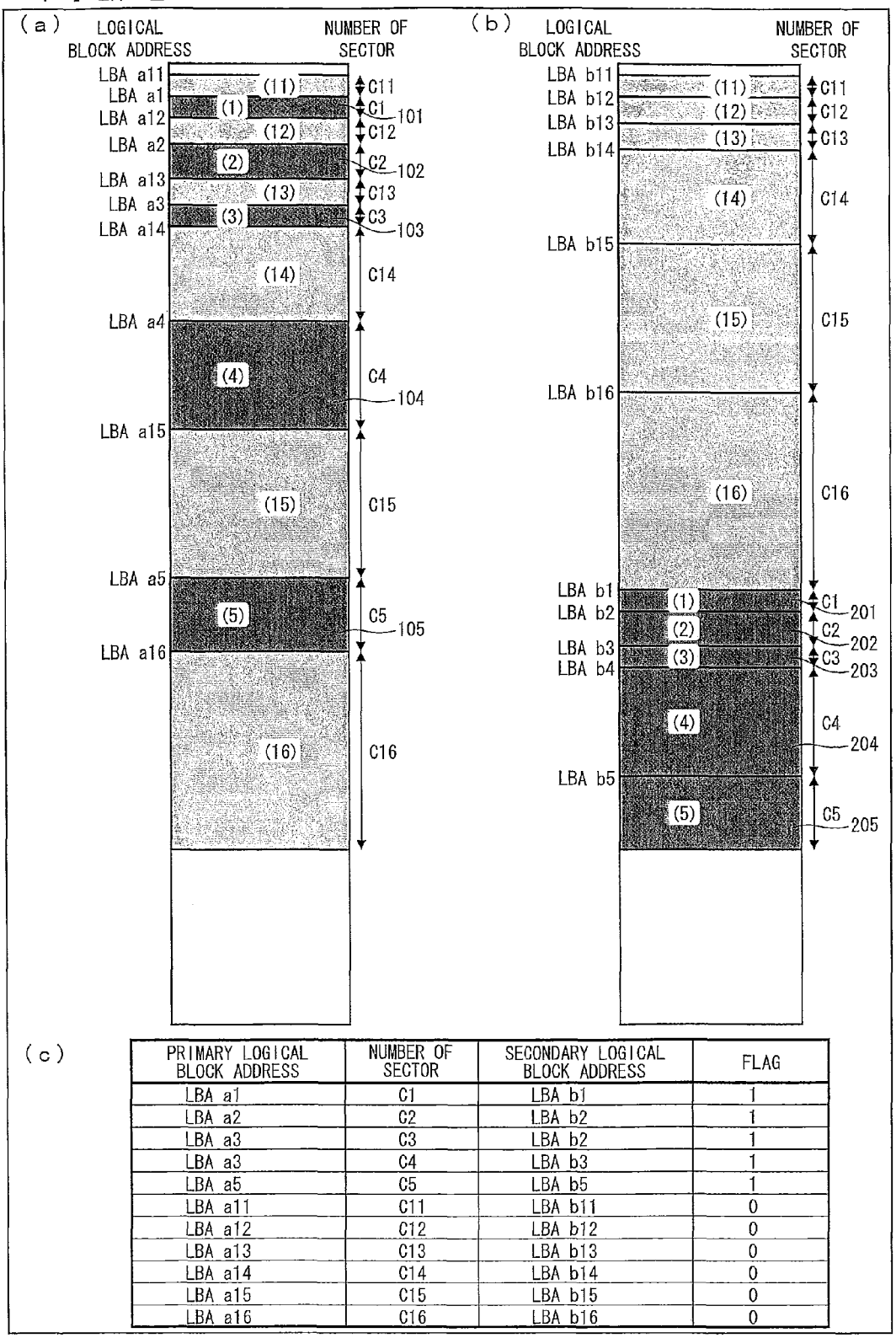
FIG. 2 is a diagram for explanation of contents of an address conversion table of the present embodiment of the present invention. (a) of FIG. 2 illustrates an arrangement of that areas on a master disk in which the boot information is recorded. (b) of FIG. 2 illustrates an arrangement of those areas on an optical disc in which the boot information is recorded. (c) of FIG. 2 shows the contents of the address conversion table.

The following describes one embodiment of the recording method of the present invention, with reference to figures.

The present embodiment deals with a method for recording, on a blank disk, boot information (i.e., information to be read out by a computer in order that an OS may be started) recorded on a master disk. However, the present invention is not limited to this. That is, the present invention is widely applicable to methods for recording, on an optical disc, information made up of a plurality of elements to be read out in a predetermined order.

In addition, although the following assumes that the master disk and the blank disk are Blu-ray discs (BDs), the present invention is not limited to this. That is, in the present embodiment, a Blu-ray disk can be substituted with another type of optical disc such as a digital versatile disk (DVD) and a compact disk (CD). That is, the present invention is widely applicable to optical discs.

Further, although the following assumes logical block address to be area specifying information specifying (i) those areas on the master disk in which the elements are recorded and (ii) those areas on the blank disk in which the elements are to be recorded, the present invention is not limited to this. That is, in the present embodiment, the logical block addresses can be substituted with another area specifying information such as physical sector addresses. For example, for layers in which physical sector addresses of a layer are specified by an upper layer, the physical sector addresses are used as area specifying information.

(Recording System)

The following first describes a recording system 1 for carrying out the recording method of the present embodiment, with reference to FIG. 1. FIG. 1 is a block diagram illustrating an arrangement of the recording system 1.

As illustrated in FIG. 1, the recording system 1 includes a personal computer 10, a protocol analyzer 11, an optical disc drive 12, a personal computer 20, an optical disc drive 21, and an optical disc drive 22. Schematically, the recording system 1 is a system for recording, on an optical disc 32 which is the blank disk, boot information recorded on an optical disc 31 which is the master disk.

The boot information recorded on the optical disc 31 contains elements such as a boot program recorded in a master boot record (MBR), programs constituting an OS such as a kernel and a device driver, and data which is referred to by the programs, and the programs and the data are recorded in a file system administrative area. Of these elements, each element recorded in the file system administrative area is information to be administered, as information stored in a single file, in a file system which administers information recorded on the optical disc 31. The optical disc 32 on which the boot information has been recorded by the recording system 1 is assumed to be used as a boot disk on the personal computer 10 or on another personal computer having the same arrangement as the personal computer 10.

In the recording system 1, the personal computer 10, the protocol analyzer 11, and the optical disc drive 12 are members for determining an order in which the boot information is read out from the optical disc 31 by the personal computer 10.

The personal computer 10 is connected with the optical disc drive 12 via a bus 13 (SATA, IDE, or the like). The personal computer 10 reads out, in a predetermined order, the elements of the boot information from the optical disc 31 which has been loaded in the optical disc drive 12 in a boot process.

In reading out each element of the boot information from the optical disc 31, the personal computer 10 issues, to the optical disc drive 12, a command corresponding to an area where the element is recorded. The protocol analyzer 11 analyzes the command so as to determine that area on the optical disc 31 in which the element is recorded, and registers, in access history, area specifying information specifying the area. Thus, access records are generated which indicate in what order the personal computer 10 read out each element recorded in which area.

In the recording system 1, the personal computer 20 and the optical disc drives 21 and 22 serve as means for recording, on the optical disc 32, the boot information recorded on the optical disc 31. The personal computer 20 includes an access record retention section 20a, a data relocation section 20b, and an address conversion table retention section 20c.

The personal computer 20 is connected with the optical disc drive 21 via a bus 23 (SATA, IDE, or the like) and with the optical disc drive 22 via a bus 24 (SATA, IDE, or the like). The personal computer 20 reads out the boot information from the optical disc 31 (master disk) loaded in the optical disc drive 21 and records the boot information thus read out on the optical disc 32 (blank disk) loaded in the optical disc drive 22. The data relocation section 20b carries out a process of reading out the boot information from the optical disc 31 and a process of recording the boot information thus read out on the optical disc 32.

The access record retention section 20a is a memory section for storing an access record generated by the protocol analyzer 11. Before recording the boot information on the optical disc 32, the data relocation section 20b obtains the access history from the protocol analyzer 11 via a bus 14 (USB or the like) and stores the access history in the access record retention section 20a. In recording the boot information on the optical disc 32, the data relocation section 20b refers to the access history stored in the access record retention section 20a, in order to record, in contiguous areas on the optical disc 32, the elements of the boot information, in an order in which the elements are read out from the optical disc 31.

The address conversion table retention section 20c is a memory section for storing an address conversion table generated by the data relocation section 20b. Before recording the boot information on the optical disc 32, the data relocation section 20b generates the address conversion table and stores, in the address conversion table retention section 20c, the address conversion table thus generated. After recording the boot information on the optical disc 32, the data relocation section 20b records, on the optical disc 32, the address conversion table stored in the address conversion table retention section 20c.

The explanation above shows a system made up of the devices illustrated in FIG. 1, as an example of a device for recording, on the optical disc 32, the boot information recorded on the optical disc 31. However, the system can be realized as a single device which is a combination of the devices illustrated in FIG. 1 or which is the combination except one or more devices.

(Arrangement of Area Where Boot Information is Recorded and Address Conversion Table)

(a) of FIG. 2 is a diagram illustrating an example of arrangement of those areas on the optical disc 31 in which the boot information is stored. An area 101 is an area where an element is recorded which is read out first by the personal computer 10 from the optical disc 31. An area 102 is an area where an element is recorded which is read out second by the personal computer 10 from the optical disc 31. The same holds for an area 103 and subsequent areas. As illustrated in (a) of FIG. 2, the areas 101 through 105 in which the boot information is recorded are discretely arranged on the optical disc 31 which serves as the master disk. In other areas, information except the boot information is recorded.

On the other hand, (b) of FIG. 2 is a diagram illustrating an arrangement of those areas on the optical disc 32 in which the boot information is recorded. The area 201 is an area in which an element is recorded which is read out first by the personal computer 10 from the optical disc 31. The area 202 is an area in which an element is recorded which is read out second by the personal computer 10 from the optical disc 31. The same holds for an area 203 and subsequent areas. As illustrated in FIG. 2, the elements of the boot information are recorded in physically-contiguous areas made up of the areas 201 through 205.

Furthermore, the areas 201 through 205 are arranged in an order in which the elements recorded therein have been read out from the optical disk 31. That is, an area where an element read out i-th from the optical disk 31 is recorded is adjacent to both an area where an element read out (i−1)th from the optical disk 31 is recorded and an area where an element read out (i+1)th from the optical disk 31 is recorded. For example, the area 202 where the element read out second from the optical disk 31 is recorded is adjacent to both the area 201 where the element read out first from the optical disk 31 is recorded and the area 203 where the element read out third from the optical disk 31 is recorded. Therefore, no unnecessary seek is caused, provided that the elements of the boot information are read out from the optical disk 32 in an order in which the elements have been read out from the optical disk 31. As illustrated in (b) of FIG. 2, the information except the boot information is stored in an area except those areas 201 through 205 in which the boot information is recorded.

(c) of FIG. 2 is a diagram showing an example of the address conversion table generated by the data relocation section 20b. As shown in (c) of FIG. 2, the address conversion table stores, for each element of the boot information, (i) area specifying information specifying that area on the optical disc 31 in which the element is recorded and (ii) area specifying information specifying that area on the optical disc 32 in which the element is recorded, in such a manner that the two types of area specifying information are correlated with each other. In addition, the address conversion table stores, also for each element of the information except the boot information, (i) area specifying information specifying that area on the optical disk 31 in which the element is recorded and (i) area specifying information specifying that area on the optical disk 32 in which the element is recorded, in such a manner that the two types of area specifying information are correlated with each other. Further, the address conversion table contains flags indicating whether each pair of pieces of area specifying information stored in the address conversion table is area specifying information of an element of the boot information or area specifying information of an element of the information except the boot information. Each pair of pieces of area specifying information for which pair a flag "1" is set is area specifying information of boot information whereas each pair of pieces of area specifying information for which pair a flag "0" is set is area specifying information of information except the boot information.

The address conversion table shown in (c) of FIG. 2 is arranged such that areas where the elements of the boot information are recorded and areas where the elements of the information except the boot information are recorded are each specified by a logical block address of a first sector of the area and the number of sectors constituting the area. Therefore, the address conversion table exemplified in (c) of FIG. 2 stores, for each element, (i) a logical block address $LBAai$ of a first sector in that area on the optical disc 31 in which the element is recorded, (ii) a logical block address $LBAbi$ of a first sector in that area on the optical disc 32 in which the element is recorded, and (iii) the number of sectors $ci$ of sectors constituting that area on the optical disk 31 in which the element is recorded (the number is equal to that of the optical disc 32), in such a manner that the logical block address $LBAai$, the logical block address $LBAbi$, and the number of sectors $ci$ are correlated with each other.

For example, the address conversion table stores (i) a logical block address $LBAa1$ of a first sector in an area 101 in which an element to be read out first from the optical disc 31 is recorded, (ii) a logical block address $LBAb1$ of a first sector in an area 201 in which the element is recorded on the optical disc 32, and (iii) the number of sectors $c1$ of sectors constituting the area 101 (the number is equal to the number of sectors constituting the area 201).

According to (b) of FIG. 2, areas where the elements of the boot information are recorded and areas where the elements of the information except the boot information are recorded are both relocated from their original positions illustrated in (a) of FIG. 1. However, it can be arranged such that the areas where the elements of the information except the boot information are recorded are not relocated, provided that the areas where the elements of the boot information are recorded can be arranged as illustrated in (b) of FIG. 2 without changing an arrangement of the areas where the elements of the information except the boot information are recorded. In this case, the address conversion table is not required to store (i) a pair of pieces of area specifying information corresponding to an element of the information except the boot information, nor (ii) a flag.

The description above assumes that each piece of information which is administered as information stored in a single file in a file system is an element of the boot information, and the address conversion table stores, for each element, a pair of pieces of area specifying information corresponding to the element. However, the present invention is not limited to this. That is, by assuming that boot information recorded in contiguous areas on the optical disc 31 is one element independently of whether the boot information is information which is administered as information stored in a single file or in a plurality of files, the address conversion table can store pairs of pieces of the area specifying information which pairs corresponds respectively to the elements of the boot information. This makes it possible to reduce the number of pairs of pieces of area specifying information to be stored in the address conversion table. As a result, a data size of the address conversion table can be reduced.

(Recording Method)

Figure 3:
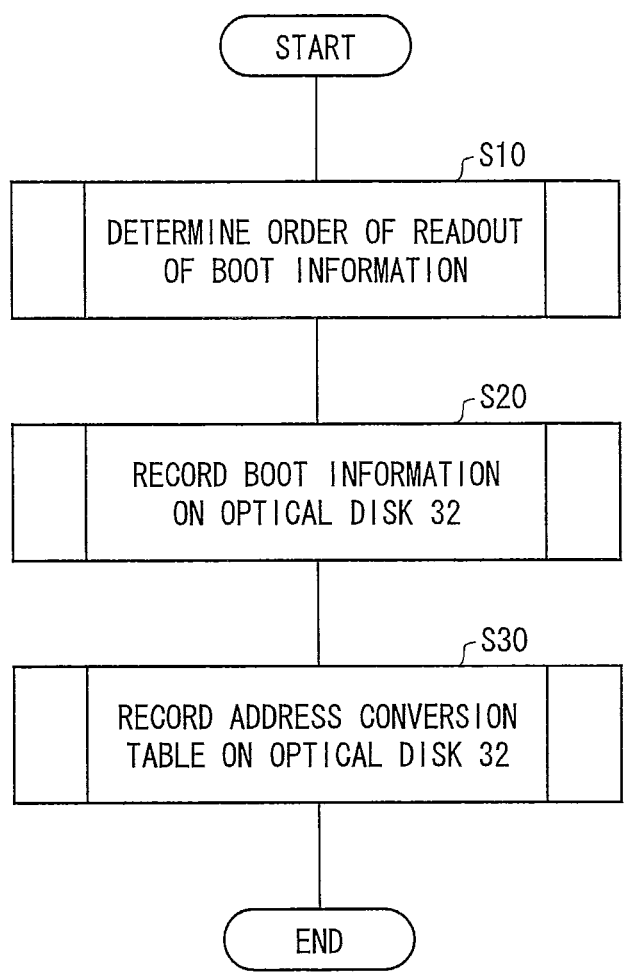
FIG. 3 is a flowchart showing a method of the present embodiment for recording the boot information on an optical disc.

The following describes the recording method of the present embodiment, i.e., a method for recording the boot information which method is carried out by use of the recording system 1, with reference to FIG. 3. FIG. 3 is a flowchart showing the recording method of the present embodiment.

As shown in FIG. 3, the recording method of the present embodiment schematically includes (1) step S10 of determining an order in which the boot information is read out from the optical disc 31, (2) step S20 of recording the boot information on the optical disc 32, and (3) step S30 of recording the address conversion table on the optical disc 32. As described later, the address conversion table to be recorded on the optical disc 32 in the step S30 is generated in the step S20 of recording the boot information on the optical disc 32.

The step S10 of determining an order in which the boot information is read out from the optical disk 31 can be realized by, e.g., the following steps S11 through S14.

S11: First, as instructed by the personal computer 10, the protocol analyzer starts accumulating access records.

S12: Then, an operator performs a manual operation so that the personal computer 10 starts a boot process.

As described above, in reading out each element of the boot information from the optical disc 31, the personal computer 10 issues, to the optical disc drive 12, a command corresponding to an area where the element is recorded. The protocol analyzer 11 analyzes the command in order to determine an area where the element is recorded, and records, in the access history, area specifying information specifying the area. Thus, access records are generated which indicate in what order the personal computer 10 read out each element recorded in which area.

S13: After the boot process is completed, the operator performs a manual operation so that the protocol analyzer 11 ends accumulating access records.

S14: Lastly, the personal computer 20 obtains the generated access records from the protocol analyzer 11, and stores the access records in the access record retention section 20a. Thus, the step S10 is completed which is a step of determining an order in which the boot information is read out from the optical disc 31.

The step S20 of recording the boot information on the optical disc 32 can be realized, e.g., in such a manner that the data relocation section 20b repeatedly carries out the following steps S21 through S23 with respect to each piece of the area specifying information stored in the access history.

S21: First, the data relocation section 20b reads out an element of the boot information recorded in an area specified by selected area specifying information.

S22: Then, the data relocation section 20b records, on the optical disc 32, the element read out in the step S21. In this process, the data relocation section 20b records the element in an area adjacent to an area where another element of the boot information has been previously recorded. That is, the data relocation section 20b records the element in an area whose first sector follows a last sector in an area where another element of the boot information has been previously recorded.

S23: Lastly, the data relocation section 20b stores, in the address conversion table, (i) area specifying information specifying that area on the optical disc 31 in which the element read out in the step S21 is recorded and (ii) area specifying information specifying that area on the optical disc 32 in which the element is recorded in the step S22, in such a manner that the two types of area specifying information are correlated with each other. More specifically, the data relocation section 20b stores, in the address conversion table, (i) a logical block address LBAai of a first sector in that area on the optical disc 31 in which the element read out in the step S21 is recorded, (ii) a logical block address LBAbi of a first sector in that area on the optical disc 32 in which the element is recorded in the step S22, and (iii) a size ci (unit: the number of sectors) of the element read out in the step S21, in such a manner that the logical block addresses LBAai, the LBAbi, and the size ci are correlated with each other. In addition, the data relocation section 20b sets, to 1, a flag for the pair of pieces of area specifying information.

The data relocation section 20b repeatedly carries out the steps S21 through 23 with respect to each piece of area specifying information registered in the access history. Thus, the step S20 is completed which is a step of recording the boot information on the optical disc 32. The data relocation section 20b repeatedly carries out the steps S21 through S23 with respect to each piece of the area specifying information in an order in which the pieces of the area specifying information are registered in the access history. Therefore, the elements of the boot information are recorded on the optical disc 32 in an order in which the personal computer 10 reads out the elements from the optical disk 31. As a result, the elements of the boot information are recorded in contiguous areas on the optical disc 32 in an order in which the elements are read out from the optical disk 31 (see (b) of FIG. 2).

After recording, on the optical disc 32, the boot information recorded on the optical disc 31, the data relocation section 20b records, on the optical disc 32, non-boot information (the information except the boot information) recorded on the optical disk 31. In this process, the data relocation section 20b registers in the address conversion table, also for each of elements of the non-boot information, (i) area specifying information specifying that area on the optical disc 31 in which the element is recorded, and (ii) area specifying information specifying that area on the optical disc 32 in which the element is recorded, in such a manner that the two types of area specifying information are correlated with each other. In addition, the data relocation section 20b sets, to 0, flags for the two types of area specifying information.

From a viewpoint of recording without dividing each individual piece of the non-boot information, it is preferable to record the non-boot information on the optical disc 32 by the following algorithm.

(1) A size of the following (i) non-boot information on the optical disk 31 is compared with a size of the following (ii) free area on the optical disk 32: (i) non-boot information (i.e., information recorded in an area, illustrated in (a) of FIG. 2, having a logical block address LBAa16 and subsequent logical block addresses, namely, non-boot information on the optical disk 31 which is to be recorded on the optical disk 32 so as to overlap previously-recorded boot information if recorded in a positionally corresponding recording area on the optical disk 32; the non-boot information is hereinafter referred to as "information X") recorded in an area (i.e., area, illustrated in (a) of FIG. 2, having logical block addresses LBAb1 and subsequent logical block addresses) on the optical disc 31 which area positionally corresponds to that area on the optical disc 32 in which the boot information is recorded; (ii) each of free areas on the optical disc 32 which correspond to those areas on the optical disc 31 in which the boot information is recorded (i.e., an area Y1 illustrated in (b) of FIG. 2, having logical block addresses from LBAa1 to LBAa12, an area Y2 having logical block addresses from LBAa2 to LBAa13, an area Y3 having logical block addresses from LBAa3 to LBAa14, an area Y4 having logical block addresses from LBAa4 to LBAa15, and an area Y5 having logical block addresses from LBAa5 to LBAa16).

(2) If any one of the areas Y1 through Y5 is an area Yi in which the information X can be recorded (i.e., an area which is larger than a size of the information X or which is equal to the size of the information X), the non-boot information recorded on the optical disc 31 is recorded on the optical disc 32 as below. That is, the information X is recorded in the free area Yi while remaining non-boot information is recorded in positionally corresponding areas on the optical disc 32.

(3) If there is no free area in which the information X can be recorded, the non-boot information recorded on the optical disc 31 is recorded on the optical disc 32 as below. That is, a first element (i.e., non-boot information recorded in an area, illustrated in (a) of FIG. 2, having logical block addresses from LBAa11 to LBAa1) of the non-boot information is recorded in a free area on the optical disc 32. Then, a second element (i.e., non-boot information recorded in an area having logical block addresses from LBAa12 to LBAa2) is recorded so as to immediately follow the first element (i.e., so that two recording areas may be contiguous with each other). As a result, a new free area Z arises between a tail of that area on the optical disk 32 in which the second element is recorded and a head of that area in which a third element is to be recorded. If the information X can be recorded in the new free area Z, the information X is recorded therein, and the third element and subsequent elements are recorded in positionally corresponding areas on the optical disc 32. If the information X cannot be recorded in the new free area Z, the third element is recorded so as to immediately follow the second element, and then, attempted is to record the information X in a free area formed between a tail of the area where the third element is recorded and a head of an area where a fourth element is to be recorded. Such processes are repeatedly carried out until a free area in which the information X can be recorded arises.

In the step S20 of recording the boot information on the optical disc 32, the boot information is preferably recorded in sectors as close to an outer periphery of the optical disc 32 as possible.

The following describes one example of a method for recording in sectors as close to an outer periphery of an optical disc as possible, with reference to FIG. 7. FIG. 7 is a diagram illustrating the optical disc 32. Also in the case of recording in such sectors, the steps S21 through S23 are carried out with respect to each of a plurality of elements. However, there is the following difference. That is, the difference is that in the step S22 regarding the first element of the boot information, the first element of the boot information is recorded in a sector 60 whose sector number is found by subtracting, from the total number of sectors on the optical disc 32, the number of sectors $(C1+C2+C3+C4+C5)$ constituting a boot area. Thus, the steps S21 through S23 are carried out with respect to each of the elements. Accordingly, the boot information is recorded on the optical disc 32 from an innermost track (i.e., track indicated by a black portion in FIG. 7) to an outer track (i.e., track indicated by a shaded portion in FIG. 7). As a result, a piece of the boot information is recorded in a sector as close to the outer periphery of the optical disc 32 as possible.

The following explains the reason why it is preferable to record the boot information in a sector as close to the outer periphery as possible.

By increasing the number of rotations at the outer periphery, the optical disc drive can increase a speed of accessing information recorded in an outer track higher than a speed of accessing information recorded in an inner track. Therefore, at least such an optical disc drive can reduce a time for a start-up of an OS.

According to the recording method described above, only the boot information recorded on the optical disc 31 is recorded on the optical disc 32. However, application software, data which is frequently accessed, etc. can be subsequently recorded on the optical disc 32 in an assumable order in which the software, data, etc. are read out from the optical disc 32.

The data relocation section 20b preferably records the address conversion table in an area outside the file system administrative area on the optical disc 32. This is because the arrangement allows an optical disc drive 40 to be described later to carry out an address conversion process independently of file systems.

(Optical Disc Drive Device)

Figure 4:
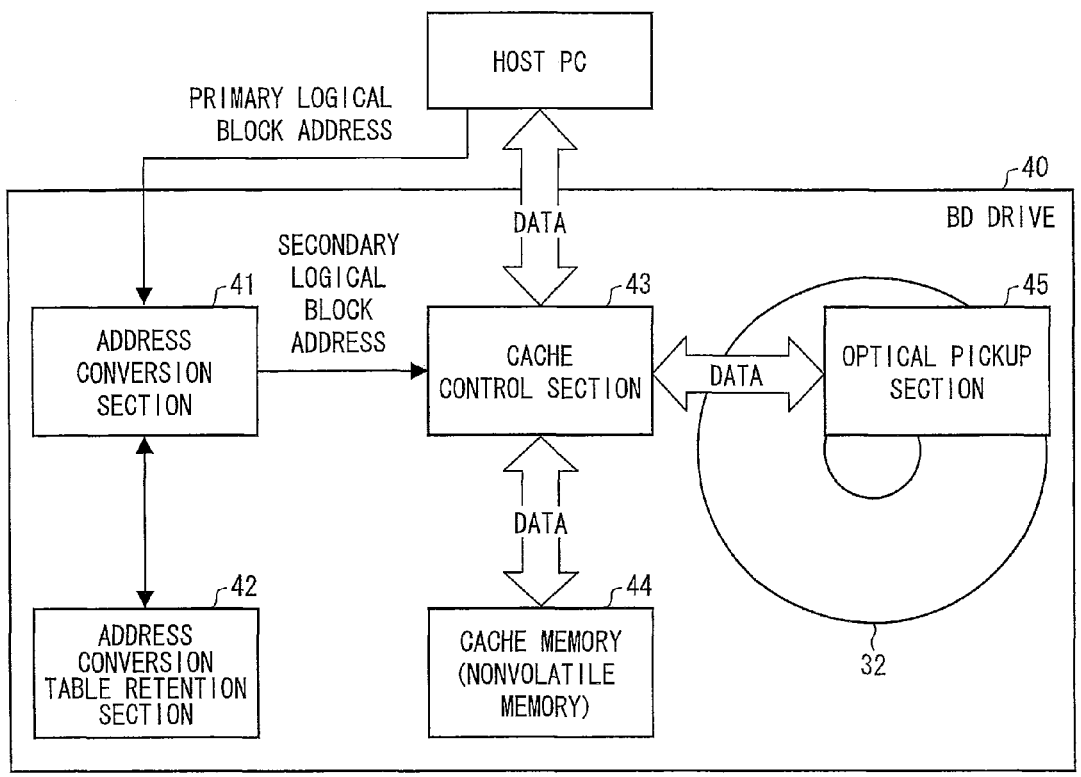
FIG. 4 is a block diagram illustrating an arrangement of an optical disc drive device of the present embodiment.

With reference to FIG. 4, the following describes the optical disc drive 40 which reads out the boot information from the optical disc 32 on which the boot information is recorded by the recording method of the present embodiment. FIG. 4 is a block diagram illustrating an arrangement of the optical disc drive device 40. The optical disc drive device 40 is assumed to be provided in a personal computer having the same arrangement as the personal computer 10. The personal computer having the optical disc drive 40 is hereinafter referred to as "host PC."

As illustrated in FIG. 4, the optical disc drive 40 includes an address conversion section 41, an address conversion table retention section 42, a cache control section 43, a cache memory 44, and an optical pickup section 45. The cache memory 44 is preferably a nonvolatile memory such as a NAND flash memory. This is because since the nonvolatile memory can retain cache data even if power of the optical disc drive 40 is turned off, an access speed can be increased due to a cache effect in a case where the power of the optical disc drive device 40 is turned on again. Note that if an increase in access speed due to the cache effect is not required, the cache memory 44 can be realized as a volatile memory such as a DRAM.

In a case where the optical disc 32 is loaded in the optical disc drive device 40, the optical pickup section 45 automatically reads out the address conversion table from the optical disc 32 so as to store the address conversion table in the address conversion table retention section 42. While operating in subsequent processes, the optical disc drive device 40 substitutes, for a first logical block address received from the host PC, a second logical block address correlated in the address conversion table with the first logical block address. That is, the optical disc drive device 40 substitutes, for logical block addresses of those areas on the optical disc 31 in which the elements of the boot information are recorded (primary logical block addresses), logical block addresses of those areas on the optical disc 32 in which the elements are recorded (secondary logical block addresses).

More specifically, the address conversion section 41 converts a primary logical block address received from the host PC into a secondary logical block address which is correlated with the primary logical block address in the address conversion table stored in the address conversion table retention section 42. For example, in the case of the address conversion table shown in (c) of FIG. 2, the address conversion section 41 converts the primary logical block address LBAa1 into the secondary logical block address LBAb1 correlated with the primary logical block address LBAa1. The address conversion section 41 supplies, to the cache control section 43, the secondary logical block address obtained by the conversion.

The cache control section 43 determines whether or not an element recorded in that area on the optical disc 32 which is specified by the secondary block address thus supplied is cached in the cache memory 44. If the element is cached, the cache control section 43 reads out the element from the cache memory 44. If the element is not cached, the cache control section 43 reads out the element from the optical disc 32 by using the optical pickup section 45. Then, the cache control section 43 returns, to the host PC, the elements read out from the cache memory 44 or from the optical disc 32.

As described above, the optical disc drive device 40 converts the primary logical block address received from the host PC into the secondary logical block address so as to return, to the host PC, the element recorded in that area on the optical disc 32 which is specified by the second logical block address. The element recorded in that area on the optical disc 32 which is specified by the secondary logical block address is originally an element recorded in that area on the optical disc 31 which is specified by the primary logical block address correlated with the secondary logical block address in the address conversion table. That is, the host PC can specify each of the elements of the boot information recorded on the optical disc 32, by use of a corresponding primary logical block address specifying that area on the optical disc 31 in which the element is recorded.

In a case where a look-ahead caching is carried out, the cache control section 43 preferably reads in the cache memory 44 the elements of the boot information, in an order in which the elements are to be read out, in accordance with the address conversion table. This is because a cache hit ratio can be improved.

Further, the cache control section 43 is preferably arranged (in a case where the address conversion table stores a flag) such that in selection of information to be deleted from the cache memory 44, the cache control section 43 selects information recorded in an area for which a flag "0" is set in the address conversion table. Alternatively, the cache control section 43 is preferably arranged (in a case where the address conversion table stores only pairs of pieces of area specifying information of the boot information) to select information recorded in an area which is not registered in the address conversion table. This is because since these arrangements make it possible to selectively delete a piece of the information except the boot information, the boot information can be surely cached, thereby allowing improvement of a speed of accessing the boot information.

Further, the cache control section 43 is preferably arranged (in a case where a flag is registered in the address conversion table) to read, in the cache memory 44, information recorded in an area for which a flag "1" is set in the address conversion table, during a period in which no processing is carried out. Alternatively, the cache control section 43 is preferably arranged (in a case where only a pair of pieces of area specifying information of the boot information is registered in the address conversion table) to read, in the cache memory 44, information recorded in an area registered in the address conversion table, during a period in which no processing is carried out. This is because since these arrangements make it possible to selectively cache the boot information during a period in which no processing is carried out, the cache memory 44 is likely to store data necessary when the host PC accesses the optical disc drive device 40, consequently allowing improvement of an access speed.

Further, the optical disc drive device 40 preferably forbids a user from taking out the optical disc 32 until all pieces of information recorded in areas for which flags "1" are set in the address conversion table are read in the cache memory 44 (in a case where flags are registered in the address conversion table). Alternatively, the optical disc drive device 40 preferably forbids a user from taking out the optical disc 32 until all pieces of information recorded in areas registered in the address conversion table are read in the cache memory 44 (in a case where only a pair of pieces of area specifying information of the boot information is registered in the address conversion table). This is because since the arrangement makes it possible to read, in the cache memory 44, all the pieces of information necessary for starting the OS up, the OS can be started up even if an optical disc 32 is taken out from the optical disc drive device 40.

Further, in a case where not only the boot information but also all information required for OS operation is recorded on the optical disc 32 as is the case with the boot information, it is possible to cause the OS to continue operating even if the optical disc 32 is taken out from the optical disc drive device 40. In this case, the optical disc drive device 40 preferably forbids a user from taking out the optical disc 32 from the optical disc drive device 40 until all the information required for the OS operation is read in the cache memory 44. The arrangement makes it possible to prevent lack of the information necessary for the OS operation after the optical disc 32 is taken out from the optical disc drive device 40.

Further, the optical disc drive device 40 can be arranged to have a data relocation function such as that of the personal computer 20. Specifically, the data relocation function is realized by providing, inside the optical disc drive device 40, an access history retention section, an address conversion table retention section, a data relocation section, etc.

Further, in a system including the optical disc drive device 40 and a specific boot disk which is used as a pair with the optical disc drive device 40, the address conversion table does not have to be recorded on the boot disk but is stored in advance in the address conversion table retention section 42 in the optical disc drive device 40. Such systems encompass a system including (i) the optical disc drive device 40 housed in a device (special-purpose device) such as a POS and an ECR and (ii) a boot disk supplied with the device.

(Modification)

According to the descriptions above, in a file system which administers information recorded on the optical disc 31, information which is administered as information stored in a single file is dealt as a unit, and any area where one unit is recorded is adjacent to another area where another unit is recorded. However, the present invention is not limited to this. That is, for example, it can be arranged such that pieces of information to be concurrently read in the cache memory 44 in the optical disc drive device 40 are dealt with a unit, and any area where one unit is recorded is adjacent to another area where another unit is recorded. This allows (i) a reduction in capacity of the address conversion retention section 20*a* for retaining the address conversion table, and (ii) ease of administration of the address conversion table.

Figure 5:
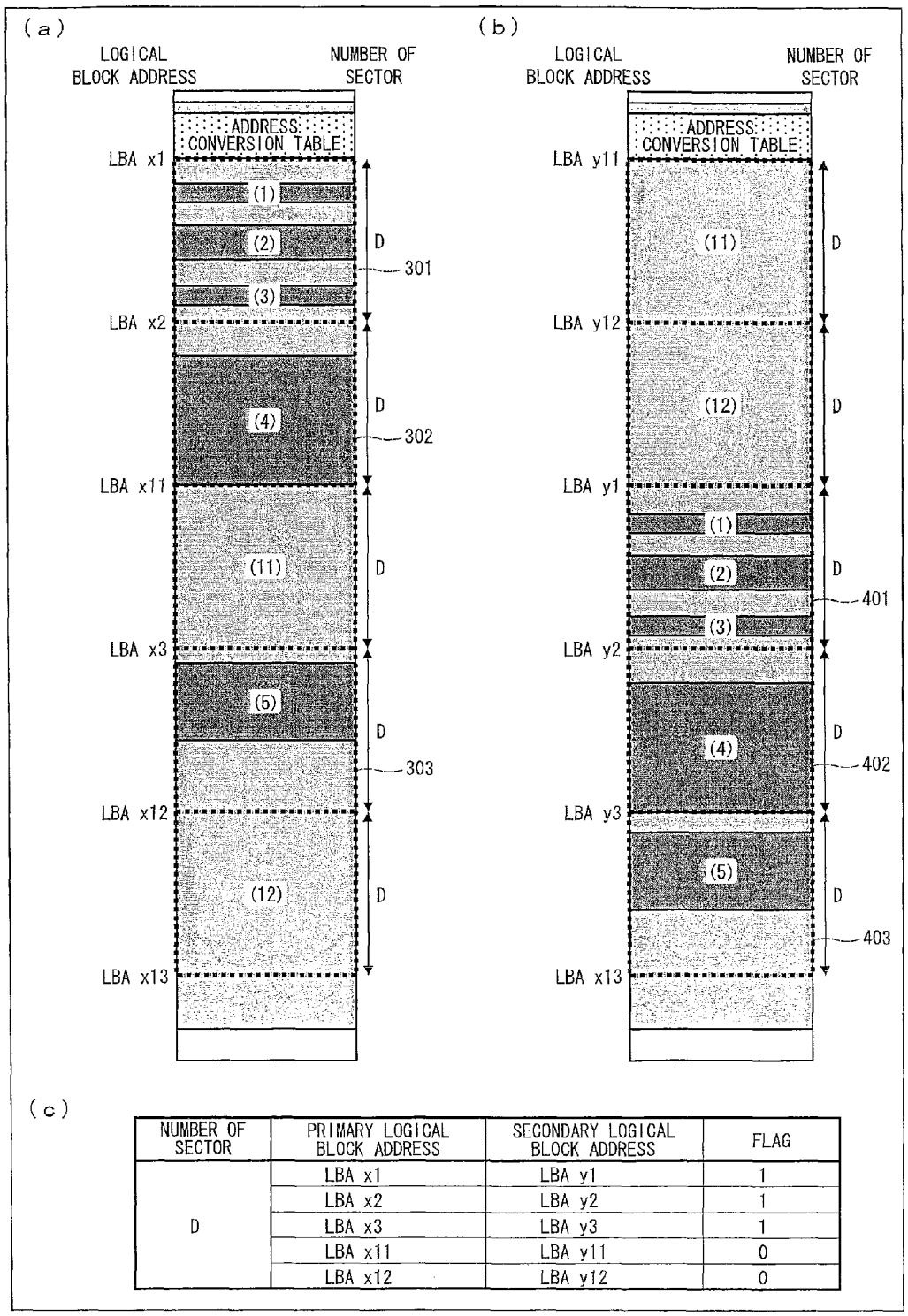
FIG. 5 is a diagram illustrating the present embodiment, specifically, illustrating one modification of the method for recording the boot information on an optical disc. (a) of FIG. 5 illustrates an arrangement of those areas on the master disk in which the boot information is recorded. (b) of FIG. 5 illustrates an arrangement of those areas on an optical disc in which the boot information is stored. (c) of FIG. 5 shows contents of the address conversion table.

FIG. 5 is a diagram illustrating contents of the address conversion table which is generated in such a modification.

(a) of FIG. 5 is a diagram illustrating an arrangement example of those areas on the optical disc 31 in which the boot information is recorded. An area 301 is an area where pieces of information to be concurrently cached first by the optical disc drive 40 are recorded. The area 301 contains up to an element of the boot information to be read out third by the personal computer 10. An area 302 is an area where pieces of information to be concurrently cached second by the optical disc drive 40 are recorded. The area 302 contains up to an element of the boot information to be read out fourth by the personal computer 10. An area 303 is an area where pieces of information to be concurrently cached third by the optical disc drive 40 are recorded. The area 303 contains up to an element of the boot information to be read out fifth by the personal computer 10. As illustrated in (a) of FIG. 5, on the optical disc 31 which serves as a master disk, the areas 301 through 303 are discretely arranged in each of which pieces of information to be concurrently cached are recorded.

(b) of FIG. 5 is a diagram illustrating an arrangement example of those areas on the optical disc 32 in which the boot information is recorded. An area 401 is an area where pieces of information to be concurrently cached first by the optical disc drive 40 are recorded. An area 402 is an area where pieces of information to be concurrently cached second by the optical disc drive 40 are recorded. An area 403 is an area where pieces of information to be concurrently cached third by the optical disc drive 40 are recorded. As illustrated in (b) of FIG. 5, on the optical disc 32 on which the boot information is recorded, pieces of information to be concurrently cached are recorded in physically-contiguous areas made up of the areas 401 through 403.

Furthermore, the areas 401 through 403 are arranged in an order in which the pieces of information recorded in areas are cached. That is, the area 402 where the pieces of information to be cached second are recorded is adjacent to the area 401 where the pieces of information to be cached first are recorded, and is adjacent to the area 403 where the pieces of information to be cached third are recorded.

(c) of FIG. 5 is a diagram showing an example of an address conversion table generated by the data relocation section 20*b*. As shown in (c) of FIG. 5, the address conversion table stores, for each group of pieces of information to be concurrently cached, (i) area specifying information specifying that area on the optical disc 31 in which the pieces of information are recorded, and (ii) area specifying information specifying that area on the optical disc 32 in which the pieces of information are recorded, in such a manner that the two types of area specifying information are correlated with each other.

Figure 6:
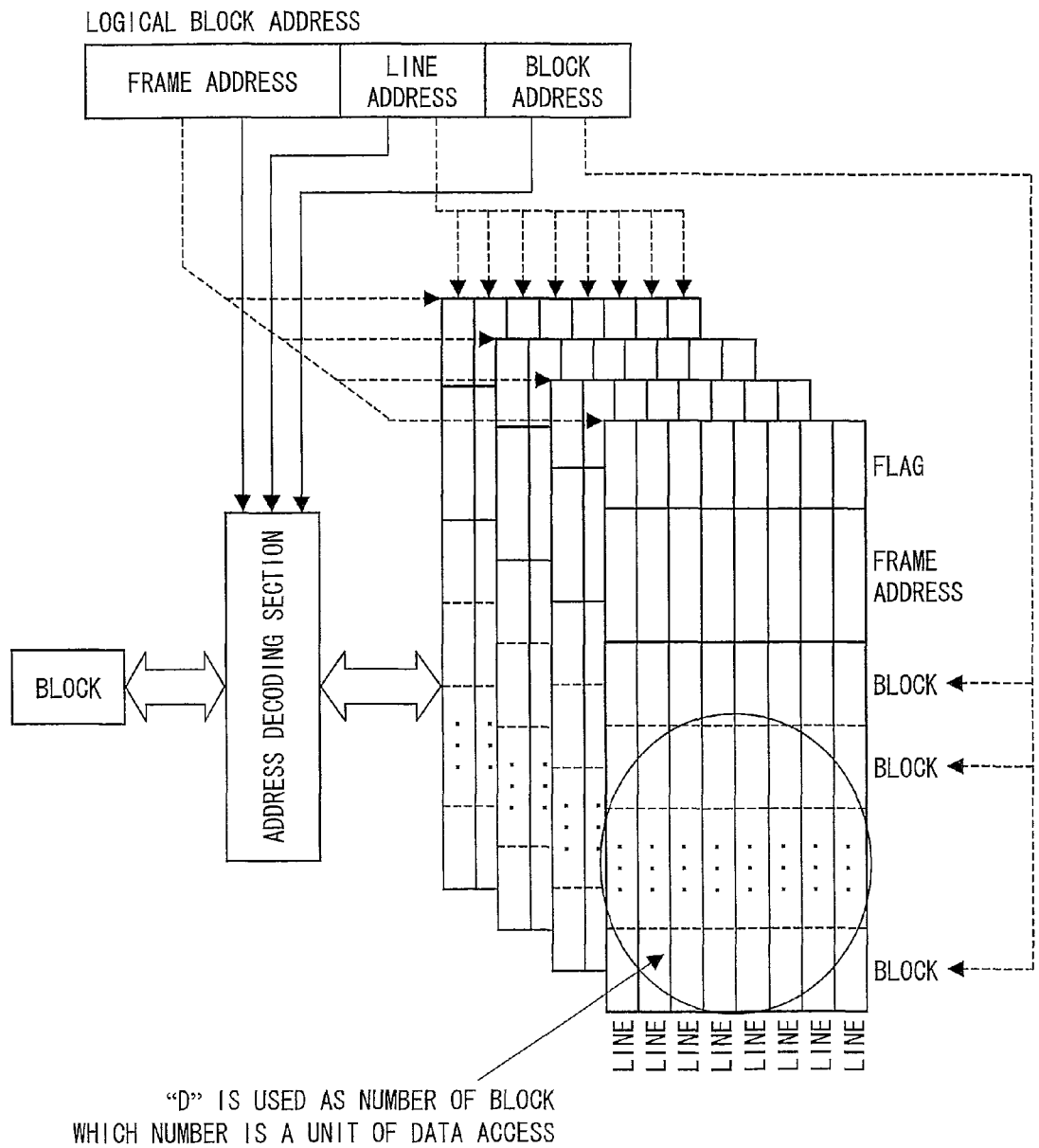
FIG. 6 is a block diagram illustrating the present embodiment, specifically, illustrating an arrangement of a cache memory provided in the optical disc drive.

The address conversion table exemplified in (c) of FIG. 5 is arranged such that an area where pieces of information to be concurrently cached are recorded is specified by a logical block address of a first sector in the area. A data size of pieces of information to be concurrently cached takes on a constant value due to, e.g., an algorism for controlling the cache memory 44. Therefore, a data size D (unit: the number of sectors) of pieces of information to be concurrently cached is specified only once. As illustrated in FIG. 6, the data size D can be determined on the basis of the number of sectors which is a unit by which the cache memory 44 is accessed (The "block" in FIG. 6 corresponds to the "sector" in the description above).

Therefore, the address conversion table exemplified in (c) of FIG. 5 stores, for each group of pieces of information to be concurrently cached, (i) a logical block address LBAai of a first sector in that area on the optical disc 31 in which the pieces of information are recorded and (ii) a logical block address LBAbi of a first sector in that area on the optical disc 32 in which the pieces of information are recorded, in such a manner that the logical block addresses LBAai and LBAbi are correlated with each other.

Since the modification can be easily realized only by the following two steps, the following omits to describe a recording system for carrying out the present modification and describe details of a recording method of the present modification. (i) Substituting the optical disc drive 12 in the recording system 1 described above with the optical disc drive device 40. (ii) Substituting the step S10 of determining an order in which the pieces of the boot information are read out by the personal computer 10 in the recording method described above with a step of determining an order in which information is cached by the optical disc drive 40.

[Additional Remarks]

Although the present invention is concretely described above by showing the embodiment, the present invention is not limited to the description of the embodiments above, but may be altered by a skilled person within the scope of the claims. An embodiment based on a proper combination of technical means disclosed in different embodiments is encompassed in the technical scope of the present invention.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention is widely applicable to arts of recording, on an optical disc, pieces of information which are read out in a predetermined order. Especially, the present invention is suitably applicable to an art of manufacturing a so-called "boot disk" on which information is recorded which is referred to by a computer in order that an OS is started up.

REFERENCE SIGNS LIST

1 Recording system (recording device)
10 Personal computer
11 Protocol analyzer
12 Optical disc drive
13 and 14 Bus
20 Personal computer
20a Access history retention section
20b Data relocation section (information recording means and table recording means)
20c Address conversion table retention section
21 Optical disc drive
22 Optical disc drive
23 and 24 Bus
31 Optical disc (master disk)
32 Optical disc (blank disk on which boot information is recorded)
40 Optical disc drive device
41 Address conversion section
42 Address conversion table retention section
43 Cache control section
44 Cache memory
45 Optical pickup section

The invention claimed is:

1. A recording method for recording, on an optical disc, start-up information for booting a computer which (i) is recorded in a recording medium and (ii) is made up of a plurality of elements which are to be read out by use of the computer from the recording medium in a predetermined order during a booting process for starting up an operating system of the computer, the recording being carried out by reading out the start-up information from the recording medium, the recording method comprising the steps of:
(a) specifying the predetermined order by detecting an order in which the plurality of elements are read out during the booting process by use of the computer to cause the operating system to be started up;
(b) recording, respectively in contiguous areas on the optical disc, the plurality of elements in the predetermined order specified in said step (a); and
(c) recording, on the optical disc, a table correlating, for each of the plurality of elements, (i) first area specifying information specifying an address area on the recording medium, in which address area the element is recorded and (ii) a second area specifying information specifying an address area on the optical disc, in which address area of each of the plurality of elements is recorded in the step (b), each of the plurality of elements being an element recorded in a predetermined address area for recording the element on the recording medium.

2. The recording method as set forth in claim 1,
wherein the step (b) includes preferentially selecting, as an address area specified by the second area specifying information, a sector which constitutes, among tracks on the optical disc, a track closer to an outer periphery of the optical disc.

3. The recording method as set forth in claim 1,
wherein each of the plurality of elements is information to be administered, in a file system which administers start-up information recorded on the recording medium, as information stored in a single file.

4. The recording method as set forth in claim 1,
wherein
each of the plurality of elements is (i) information to be administered, in a file system which administers start-up information recorded on the recording medium, as information stored in a single file or in a plurality of files, and is (ii) information recorded in contiguous areas on the recording medium.

5. The recording method as set forth in claim 1,
wherein
the plurality of elements are pieces of information which an optical disc drive which reads out start-up information recorded on the optical disc reads in a cache memory concurrently.

6. A recording device for recording, on an optical disc, start-up information for booting a computer which is (i) recorded in a recording medium and (ii) is made up of a plurality of elements which are to be read out by use of the computer from the recording medium in a predetermined order during a booting process for starting up an operating system of the computer, the recording being carried out by reading out the start-up information from the recording medium, the recording device comprising:
order specifying means for specifying the predetermined order by detecting an order in which the plurality of elements are read out during the booting process by use of the computer to cause the operating system to be started up;

information recording means for recording, respectively in contiguous areas on the optical disc, the plurality of elements in the predetermined order specified by the order specifying means; and table recording means for recording, on the optical disc, a table correlating, for each of the plurality of elements, (i) first area specifying information specifying an address area on the recording medium in which address area the element is recorded and (ii) second area specifying information specifying an address area on the optical disc, in which address area of each of the plurality of elements is recorded by the information recording means, each of the plurality of elements being an element recorded in a predetermined address area for recording the element on the recording medium.

7. An optical disc on which start-up information for booting a computer is recorded, the start-up information being (i) recorded in a recording medium and (ii) made up of a plurality of elements which are to be read out by use of a computer from the recording medium in a predetermined order during a booting process for starting up an operating system of the computer, the recording being carried out by reading out the start-up information from the recording medium, wherein: the plurality of elements are recorded respectively in contiguous areas in the predetermined order; and a table is recorded which correlates, for each of the elements, (i) first area specifying information specifying an address area on the recording medium, in which address area the element is recorded and (ii) second area specifying information specifying an address area on the optical disc, in which address area the element is recorded, each of the plurality of elements being an element recorded in a predetermined address area for recording the element on the recording medium, the predetermined order being specified by detecting an order in which the plurality of elements are read out by use of the computer to cause the operating system to be started up.

8. A method for manufacturing an optical disc on which start-up information for booting a computer is recorded, the start-up information being (i) recorded in a recording medium and (ii) made up of a plurality of elements which are to be read out by use of a computer from the recording medium in a predetermined order during a booting process for starting up an operating system, the method comprising the steps of:

(a) specifying the predetermined order by detecting an order in which the plurality of elements are read out during the booting process by use of the computer to cause the operating system to be started up;

(b) reading out, from the recording medium in which the start-up information is recorded, each of the plurality of elements recorded in a predetermined address area for recording the element, and recording, respectively in contiguous areas on the optical disc, each of the plurality of elements in the predetermined order specified in said step (a); and (c) recording, on the optical disc, a table correlating, for each of the plurality of elements, (i) first area specifying information specifying an address area on the recording medium, in which address area the element is recorded and (ii) a second area specifying information specifying an address area on the optical disc, in which address area of each of the plurality of elements is recorded in the step (b).

9. An optical disc drive device for reading out the start-up information from an optical disc recited in claim 7, the optical disc drive device comprising:

converting means for converting, with reference to the table, externally-received area specifying information into second area specifying information correlated with first area specifying information which matches with the externally-received area specifying information; and output means for (i) reading out an element of the start-up information recorded in the address area on the optical disc, which address area is specified by the second area specifying information obtained by the converting means and (ii) outputting, outside the optical disc drive device, the element thus read out.

* * * * *